(12) United States Patent
Haerle et al.

(10) Patent No.: US 8,407,916 B2
(45) Date of Patent: Apr. 2, 2013

(54) APPARATUS FOR SOLVENT RECOVERY

(75) Inventors: Rainer Haerle, Schwieberdingen (DE);
Stephan Krauss, Schwabach (DE)

(73) Assignee: Prinotech GmbH, Nuernberg (DE)

( * ) Notice: Subject to any disclaimer, the term of this patent is extended or adjusted under 35 U.S.C. 154(b) by 403 days.

(21) Appl. No.: 12/918,939

(22) PCT Filed: Jan. 28, 2009

(86) PCT No.: PCT/DE2009/000112
§ 371 (c)(1),
(2), (4) Date: Aug. 23, 2010

(87) PCT Pub. No.: WO2009/155888
PCT Pub. Date: Dec. 30, 2009

(65) Prior Publication Data
US 2011/0000258 A1    Jan. 6, 2011

(30) Foreign Application Priority Data

Jun. 23, 2008   (DE) .......................... 10 2008 029 431

(51) Int. Cl.
*F26B 11/03* (2006.01)
(52) U.S. Cl. .................. 34/381; 34/470; 34/90; 34/218; 435/134; 60/320; 208/45; 208/67; 208/86; 208/309
(58) Field of Classification Search ............... 34/330, 34/380, 381, 471, 413, 497, 469, 90, 210, 34/138, 218; 60/320; 208/67, 86, 45, 309; 435/134, 289.4
See application file for complete search history.

(56) References Cited

U.S. PATENT DOCUMENTS

| 2,435,218 | A | * | 2/1948 | Hudson | 34/470 |
| 2,491,060 | A | * | 12/1949 | Robinson | 34/380 |
| 3,212,197 | A | * | 10/1965 | Crawford | 34/371 |
| 3,367,034 | A | * | 2/1968 | Good | 34/245 |
| 4,086,705 | A | * | 5/1978 | Wehr | 34/469 |
| 4,185,395 | A | * | 1/1980 | Nakako et al. | 34/389 |
| 4,365,480 | A |   | 12/1982 | Darm | |
| 4,484,396 | A |   | 11/1984 | Darm | |
| 4,903,414 | A | * | 2/1990 | White et al. | 34/415 |
| 5,107,605 | A | * | 4/1992 | Yamada et al. | 34/74 |
| 5,987,776 | A | * | 11/1999 | Holcombe et al. | 34/330 |
| 6,098,306 | A | * | 8/2000 | Ramsey et al. | 34/257 |
| 6,802,137 | B1 | * | 10/2004 | Gray | 34/340 |
| 2010/0043251 | A1 | * | 2/2010 | Delaine | 34/471 |
| 2011/0232124 | A1 | * | 9/2011 | Shivvers | 34/428 |

FOREIGN PATENT DOCUMENTS

| DE | 3038792 A1 | 4/1982 |
| DE | 3223583 C1 | 10/1983 |
| DE | 3339565 A1 | 5/1985 |
| DE | 3520046 A1 | 12/1986 |
| EP | 1074288 A1 | 2/2001 |

* cited by examiner

*Primary Examiner* — Stephen M. Gravini
(74) *Attorney, Agent, or Firm* — Laurence A. Greenberg; Werner H. Stemer; Ralph E. Locher

(57) ABSTRACT

An apparatus for solvent recovery from a solvent/gas mixture from the exhaust air of systems processing printing, painting or other solvents, wherein the solvent/gas mixture from at least one oil-containing solvent/gas mixture is cooled down to a temperature below the lower condensation temperature of the oil of the solvent mixture using a heat exchanger, wherein a further, second heat exchanger is connected upstream of the heat exchanger, said second heat exchanger cooling the solvent/gas mixture specifically to the condensation temperature of an oil present in the mixture and both heat exchangers produce a recovery unit.

33 Claims, 4 Drawing Sheets

APPARATUS FOR SOLVENT RECOVERY

BACKGROUND OF THE INVENTION

Field of the Invention

The invention relates to an apparatus for solvent recovery from a solvent-gas mixture, such as exist, for example, in print shops, paint shops, coating installations and the like. The solvent-gas mixture has at least one oil and is cooled down by a heat exchanger to a temperature below the condensation temperature of the at least one oil.

An apparatus of this type is known from EP 944423 B1. This apparatus is intended to purify the exhaust air from the drying equipment and machine enclosure of offset machines. In this case, the exhaust air is led through a liquefier to condense out the additives or contaminants contained in the exhaust air and through at least one separator element for the further purification of the exhaust air. By means of clever conditioning of the air parameters of the purified exhaust air provided to be fed back to the dryer and machine enclosures, it is possible to improve the workspace climate and to reduce emissions into the environment.

BRIEF SUMMARY OF THE INVENTION

The invention is based on the object of further developing an apparatus for solvent recovery from a solvent-gas mixture from the exhaust air from printing, varnishing or other solvent-processing installations, wherein, from a solvent-gas mixture containing at least one oil, by means of a heat exchanger, the solvent-gas mixture is cooled down to a temperature below the lower condensation temperature of the oil from the solvent mixture, in such a way that such highly efficient recovery of oils from the solvent-gas mixture is possible that oils obtained from the process can be introduced into the ink production circuit once more. This object is achieved by the features as claimed; a particularly advantageous method for solvent recovery is described in the method claims.

The invention first begins with the finding that, for environmental and cost reasons, it may be advantageous not to feed in particular expensive synthetic oils which are contained in a solvent-gas mixture from the exhaust air of printing presses or varnishing machines to an environmentally polluting combustion process, as has been usual hitherto, but firstly to purify the exhaust air from such oil residues, in order then to use them further in the process and to recover the oils in order to be able to feed them to an ink production operation again. To this end, at least one further, second heat exchanger is connected upstream of the usual heat exchanger in the apparatus, which cools down the solvent-gas mixture specifically to the condensation temperature of an oil contained in the mixture, the two heat exchangers forming a recovery unit.

Advantageously, a third heat exchanger is integrated into the recovery unit, is connected upstream of the second heat exchanger and cools down the solvent-gas mixture specifically to the condensation temperature of the oil having the higher condensation point in the solvent-gas mixture. As a result, in a first separation stage, it is possible for example to separate out mineral oils, which make up the predominant proportion of the oil content of a solvent-gas mixture. In a second stage, far more valuable synthetic oils are separated out, residual oil constituents and water in a third stage (first heat exchanger). The exhaust air extracted from the heat exchanger stages goes into an agglomerator and droplet trap in order to filter out aerosols, in order that the exhaust air can at least to some extent also be discharged into the environment whilst complying with the German air pollution control regulations. By means of the apparatus according to the invention, for the first time with printing presses specific recovery of solvent oils is possible, it being possible both for mineral and for synthetic oils to be separated so cleanly from the start that they can be supplied to an ink production process.

The recovery quality is improved further by a recovery unit that comprises an agglomerator and/or a droplet separator, which is arranged downstream of the first heat exchanger, droplet separators being known in principle.

The apparatus can be employed particularly well when a dryer unit is connected upstream of the recovery unit and, during the drying process, enriches a gaseous drying medium and a solvent-gas mixture with the at least two oils.

At least part of the drying medium used for the drying process can be the exhaust gas from an internal combustion engine, it being possible for the mechanical energy resulting from the internal combustion engine to be used at least partly to operate the recovery unit and/or the dryer unit, so that the result is a largely integrated, self-contained system. Since the dryer unit of the method according to the invention is not, as in the prior art, a widespread integrated dryer (combustion of the diffusing solvent within the dryer in order to utilize the heat produced in the combustion for drying the paper web), here an internal combustion engine can fulfill a plurality of functions within the method. For instance, firstly the mechanical energy can be used to produce power, which in turn can be used for the overall process (pumps), and secondly the exhaust gases from the internal combustion engine can also be used for drying the paper webs. The internal combustion engine can be constructed either as a fluidic machine (gas turbine) or as an internal combustion motor (reciprocating piston motors, rotary piston motors, double-rotary piston motors). The selection of the internal combustion engine can in this case be based on the size of the print shop and in accordance with the associated drying-gas and/or energy consumption.

At least part of the exhaust gas from the internal combustion engine can be fed to an absorption refrigerating machine; the refrigeration output resulting from this can advantageously be used for supporting for the operation of the recovery unit, for the cooling of further machines and/or for the air-conditioning of the operating building of a print shop. The fact that part of the exhaust gas from the internal combustion engine can be converted via an absorption refrigerating machine into refrigeration output means that, in the ideal case, "no external energy" is needed for the recovery unit for the specific setting of the temperatures in the heat exchangers. Finally, the exhaust gas led to the absorption refrigerating machine can be controlled and regulated in such a way that this gas is used as a controlled variable for the recovery unit (therefore for the heat exchangers), is used for the machine cooling and/or is used for the building air-conditioning. In particular, the control and regulation of the temperature of the heat exchangers is necessary when the volume flow of gases derived from the dryers and passing through the heat exchangers varies. The control and regulation of the temperature of the heat exchangers indirectly by the exhaust gases led to the absorption refrigerating machine (which supplies the recovery unit with cold) constitutes control and regulation which is simple both in technical and design terms.

Several dependent claims deal with the management and treatment of the air streams used within the apparatus; further apparatus claims relate to a particularly advantageous combination of heat exchangers, agglomerators, dryer units and internal combustion engine.

In a further development of the invention, the residual gas emerging from the recovery unit is at least to some extent supplied to the dryer unit as process gas and/or used, at least to some extent, with the admixture of fresh air as building room air. For example, the process air supplied to the dryer unit can be used as sealing air. Sealing air is needed in the dryer units in order, as a paper web is led through the dryer unit, to interlock its input and output region in the manner of an airlock, so that as far as possible no gas located within the dryer can escape from the latter. In particular in the case of using exhaust gases from an internal combustion engine, which usually contain a considerable proportion of $CO_2$, it is necessary not to allow this $CO_2$-containing gas to escape from the dryer unit in an uncontrolled manner. Since, in addition, the residual gas from the recovery unit still has a temperature of 20-80° C., the use of this gas as a sealing gas within the dryer unit is very suitable, since this does not have any detrimental influence on the dryer unit and the drying process taking place therein. Alternatively or additionally, the residual gas emerging from the recovery unit can be used with the addition of an oxygen-containing medium (for example fresh air) for air-conditioning the operating spaces of the print shop.

According to an advantageous refinement of the apparatus, at least one of the heat exchangers is constructed with multiple stages, so that the latter, for example, comprises a plurality of plates, at least the first stage (plate) of the second and/or third heat exchanger being wetted with the oil to be condensed out in each case within the respective heat exchanger. As a result of wetting at least the first stage of the heat exchanger with the oil to be condensed out, the effectiveness of the heat exchanger is increased. Such wetting of at least one stage of a heat exchanger can in principle also be applied in the agglomerators.

With regard to an overall energy balance for the overall apparatus which is as low as possible, it is advantageous if the at least two parallel-operated recovery unit can be controlled in such a way that the residence time of the solvent-gas mixture in the dryer unit can be influenced. Control of the residence time of the solvent-gas mixture can be achieved firstly by the design and the at least parallel connection of the recovery unit. Additionally or alternatively, a gas reservoir can be connected upstream, which stores the solvent-gas mixture in the event of an increased solvent-gas mixture accumulation and feeds it in a constant manner to the recovery unit. Furthermore, it is advantageous if the parallel-connected dryer units are designed differently in such a way that the exhaust gases arising in the respective dryers in the highest efficiency range can be led to the correspondingly designed recovery unit.

In a refinement of the invention, the first heat exchanger can be set in such a way that the medium fed by it to the agglomerators and/or droplet separators has a defined temperature. The first heat exchanger, connected upstream of the agglomerators and/or droplet separators therefore fulfils a dual function, firstly it is intended to separate the water and the residual oil components which could not be separated out from the upstream heat exchangers and, as a second function, it is intended to cool the gas leaving it to a defined temperature. This defined temperature is preferably coordinated with the most efficient operating range of the agglomerators and/or droplet separators.

The method, as claimed, provides for the solvent-gas mixture originating from a dryer device to be led to a recovery unit and, as the solvent-gas mixture is led through the series-connected component parts of the recovery unit, at least two oils are condensed out of the solvent-gas mixture and each collected in a collector. The constituent parts of the oil recovery unit comprise a first and a second heat exchanger, the solvent-gas mixture being led to the first through the second heat exchanger and then through the first heat exchanger. As the solvent-gas mixture is led through the second heat exchanger, it is cooled down specifically there to the condensation temperature of an oil. During the subsequent passage of the solvent-gas mixture through the first heat exchanger, the solvent-gas mixture is cooled down below the lowest condensation temperature of the at least two oils of the solvent-gas mixture.

In a further development of the method, before the solvent-gas mixture is led through the second heat exchanger, it is led through a third heat exchanger connected upstream of the second. This heat exchanger cools down the solvent-gas mixture specifically to the condensation temperature of the oil having the higher condensation point, so that the oil separated off there can be collected in a container separately from that from the second heat exchanger.

In particular, a method in which the gas emerging from the oil recovery unit is used, at least to some extent, as sealing gas for a dryer and/or as room air is advantageous in this case. It is therefore made possible to close a gas management circuit, at least for a proportion of the gas, so that the original drying gas is admixed with solvents within the dryer, is led from the dryer into the oil recovery unit and there is separated from the oil constituents and, following the oil recovery unit, can at least proportionally be "reused" as a supporting gas or sealing gas within the dryer unit. Here, supporting gas means a gas within the dryer unit which is used to support a paper web and is used only in a second function for the drying of the paper web. Since the drying is of secondary importance for the supporting gas, this can also have a lower temperature.

In the method according to the invention, the drying gas used for the dryer can be the exhaust gas from an internal combustion engine. As a result of the high temperature of the exhaust gas which emerges from the internal combustion engine, said gas is well-suited for drying a medium (paper web) within the dryer.

A further energy circuit can be closed by at least some of the exhaust gas from the internal combustion engine being led to an absorption refrigerating machine which, by using the refrigeration output/refrigeration energy obtained from it, supplies the first, second, third heat exchanger and/or regions of the building with refrigeration energy.

The invention is explained in more detail by using the exemplary embodiments in the drawing figures, in which:

DESCRIPTION OF THE INVENTION

Figure 1:
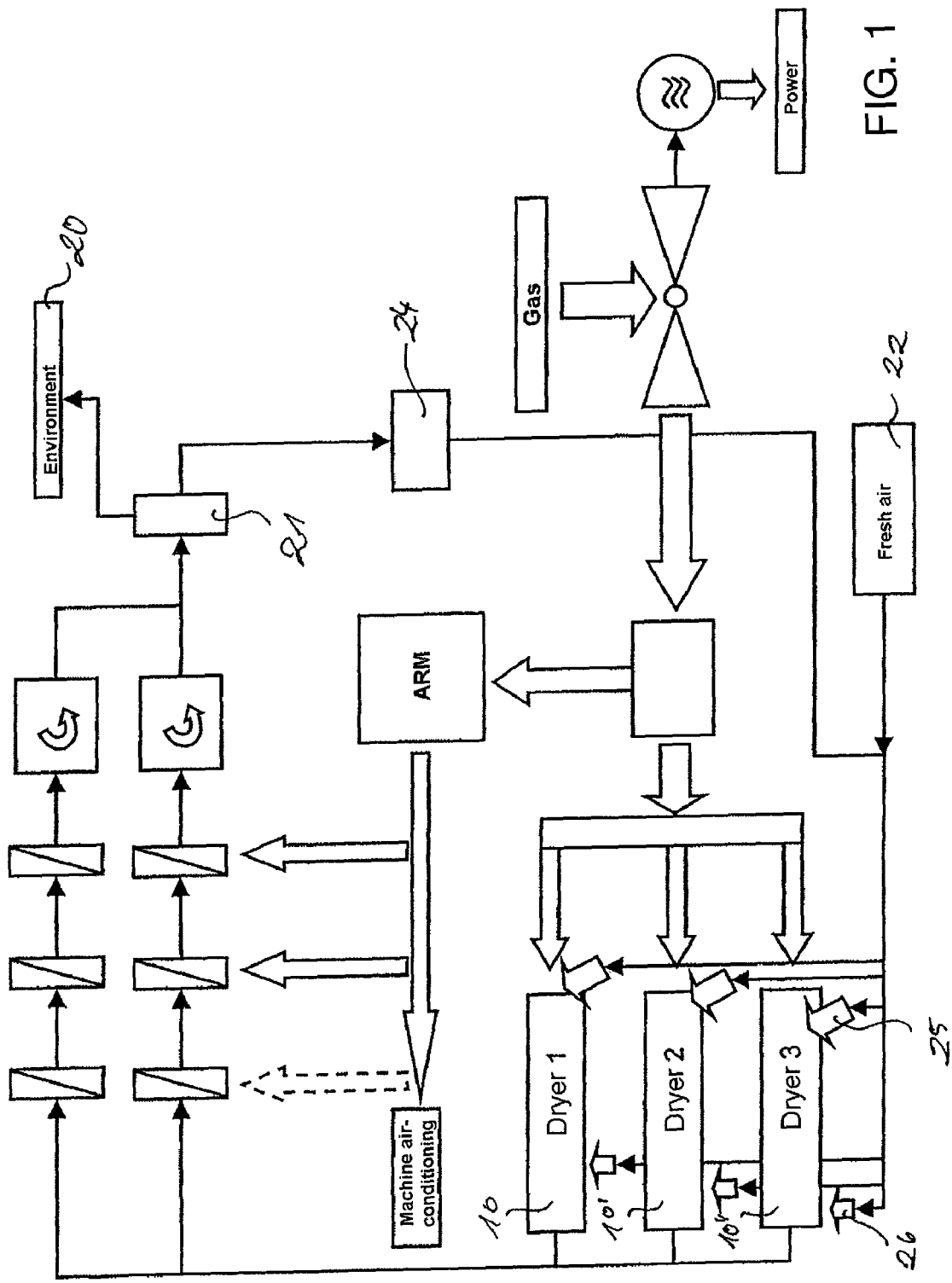
FIG. 1 shows a schematic block circuit diagram in which a solvent recovery unit is incorporated within a print shop drying process.
Figure 2:
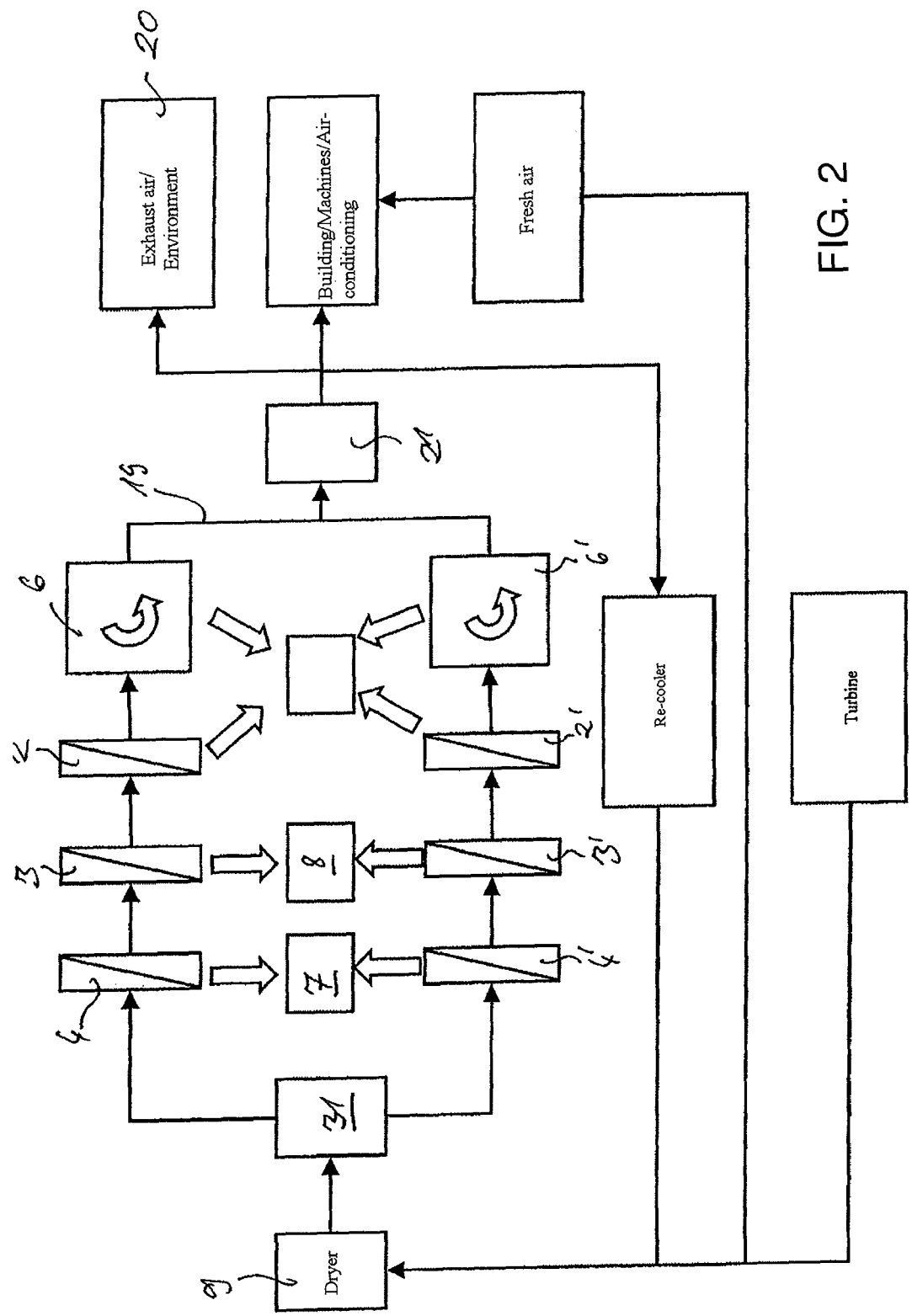
FIG. 2 shows a schematic block circuit diagram according to FIG. 1, in which the solvent recovery unit and the possible uses of the gases emerging from the latter are illustrated in more detail.

In drawing FIGS. 1 and 2, heat exchangers 2, 3, 4 within a solvent recovery unit 5 are illustrated. The heat exchangers 2, 3, 4 are connected in series, so that the solvent-gas mixture has to pass firstly through the third heat exchanger 4, after that through the second heat exchanger 3, then through the first heat exchanger 2 and lastly through an agglomerator or droplet separator 6. The third heat exchanger 4 cools down the solvent-gas mixture specifically to the condensation temperature of the oil having the higher condensation point and therefore collects the higher-condensing oil in a first container 7. The second heat exchanger 3 cools down the solvent-gas mixture emerging from the third heat exchanger 4 specifically to the condensation temperature of the oil still in the solvent-gas mixture, so that a further oil is separated off at the second heat exchanger 3 and is collected in a separate, second container 8.

The apparatus 1 is advantageously equipped with two solvent recovery unit 5, which are integrated into the gas management process so as to be connected in parallel. As a result, for example, one heat exchanger 2, 3, 4 of the first solvent recovery unit 5 can be maintained or replaced while the solvent-gas mixture treatment process can be continued unchanged via the second solvent recovery unit 5'.

The overall apparatus 1 is distinguished in particular by a drying system 9 connected upstream of the solvent recovery unit 5, 5', which in turn comprises a plurality of dryer units 10, 10', 10". In the dryer units, for example a printed paper web (not illustrated) can be dried. The solvents originating from the printing inks from the drying process of the printed paper web enrich the drying medium (gas) and is fed to the solvent recovery unit 5, 5' in order to separate out the individual oil constituents of the solvent-gas mixture. In this case, the drying medium used for the drying system 9 is the exhaust gases 11 from an internal combustion engine 12. The exhaust gas 11, the temperature of which is controlled by the combustion process of the internal combustion engine 12, is suitable as a drying medium for drying the paper web. The mechanical energy resulting from the internal combustion engine 12 can, for example, be used via a generator 13 for the production of electrical energy 14, and this electrical energy can be used to operate the recovery unit 5, 5', the drying system 9 and/or further technical equipment belonging to the apparatus 1.

Some of the exhaust gas 11 from the internal combustion engine 12 can be fed to an absorption refrigerating machine 15 for the further optimization of the overall energy balance. The refrigeration output/refrigeration energy 16 resulting from the absorption refrigerating machine 15 is in this case led to the heat exchangers 2, 2', 3, 3', 4, 4', the oil recovery unit 5, 5', for cooling further machines 17 and/or for air-conditioning parts of the building. Furthermore, via a control or regulating element 18, the distribution of the exhaust gas 11 from the internal combustion engine 12 can be led proportionally to the drying system 9, the absorption refrigerating machine 15 or exhaust gas purification installation (not illustrated) connected upstream of the environment. By means of such a control or regulating element 18 and/or a further control or regulating element (not illustrated), which is used to distribute the refrigeration output 16 from the absorption refrigerating machine 15 to the heat exchangers 2, 2', 3, 3', 4, 4', partial regulation of the output at least of parts of the overall apparatus 1 can therefore be accomplished. For instance, it is possible to compensate for a varying exhaust-gas/drying demand of the dryer unit 10, 10', 10" by means of the two or by means of one of the control or regulating elements 18. In principle, the supply of drying medium to the drying system 9 can be variable in terms of volume and/or temperature, in particular this can be controlled in a simple way by admixing fresh air. The residual gas 19 emerging from the solvent recovery unit 5, 5' is at least partly discharged from the system (the industrial process) into the environment 20. Furthermore, a control/regulating element 21 connected downstream of the solvent recovery unit 5, 5' can supply the residual gas 19 emerging from the recovery unit 5, 5' wholly or partly to the drying system 9 again as process air and/or at least partly, with the admixture of fresh air and/or fresh air treated by the refrigeration output 16 from the absorption refrigerating machine 15, can be supplied to further machines 17 and/or parts 23 of the building (room air-conditioning).

The gas 19 emerging from the solvent recovery unit 5, 5' is led through a re-cooler 24 and used within the drying system 9, at least to some extent, as sealing gas 25 and/or as supporting gas 26. In drawing FIG. 1, the gas 19 supplied to the dryer units 10, 10', 10" is illustrated as that which is used as sealing gas 25 and/or supporting gas 26. Here, it can be seen that fresh air 22 can be admixed with the gas 19 for these applications. The sealing gas 25 within the drying process is understood to be the gas which, on the inlet and outlet side of the paper web guidance in the dryer unit 10, 10', 10", is used for the purpose of preventing further gas (e.g. drying gas) from the drying system 9 from escaping from the latter. The sealing gas 25 therefore has an airlock function. The supporting gas 26 is used to support the paper web "floating" and to form an opposing support for an application of drying gas acting more intensively on the paper web.

Figure 3:
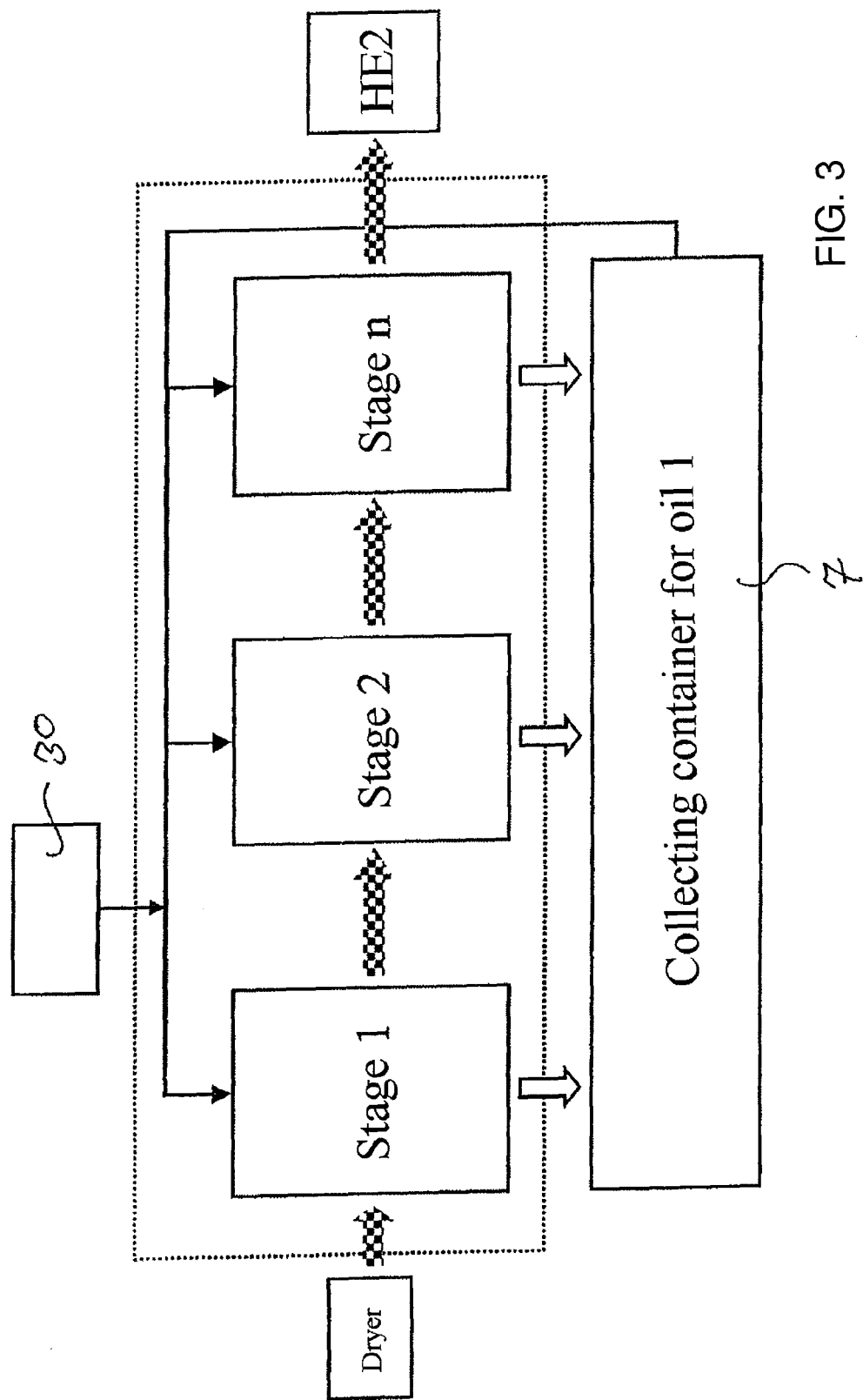
FIG. 3 shows a schematic block circuit diagram of a heat exchanger, illustrated in more detail, belonging to the oil recovery unit.
Figure 4:
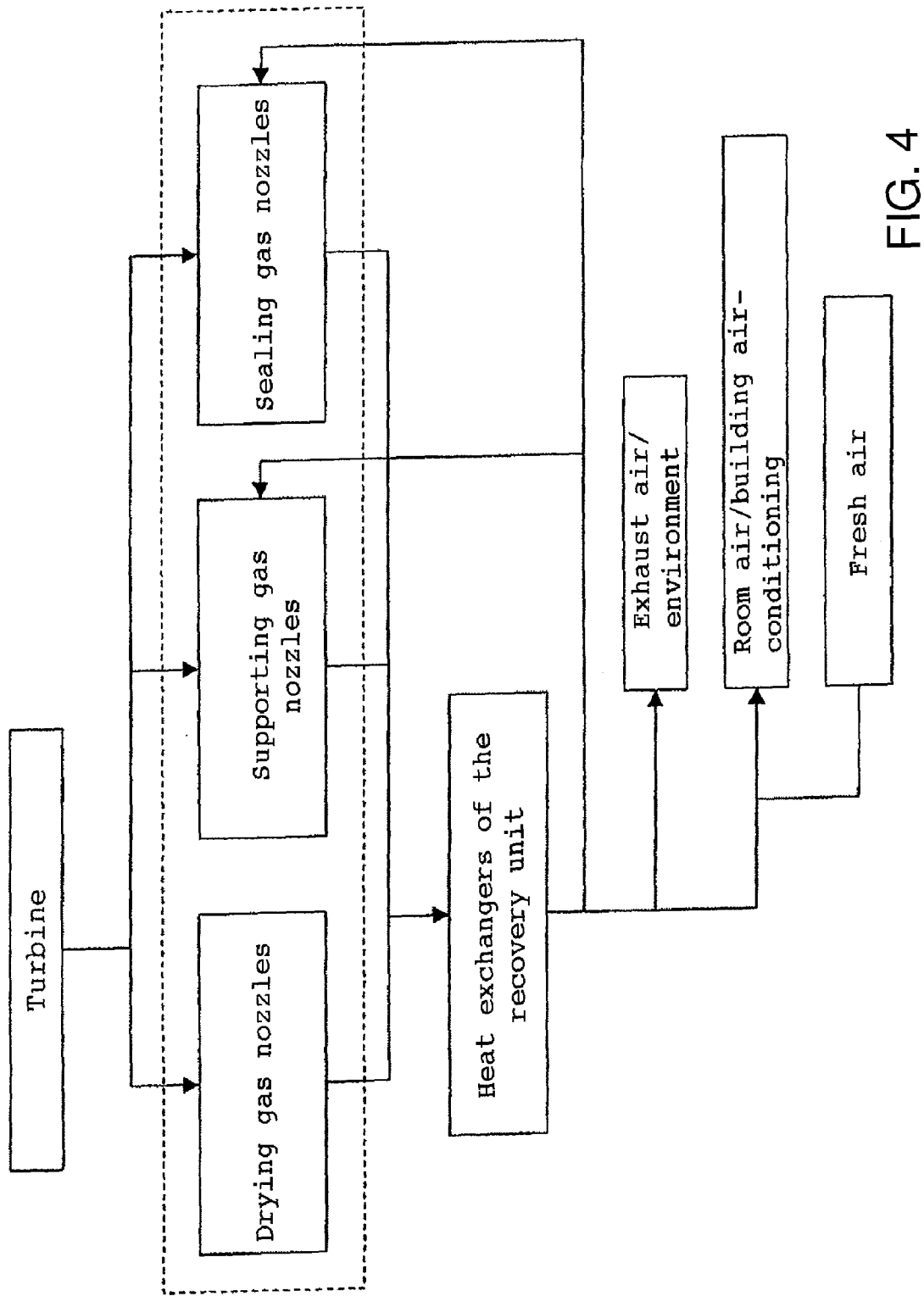
FIG. 4 shows a schematic block circuit diagram relating to the possible uses of the gas within the overall apparatus.

In drawing FIG. 3, a heat exchanger 2, 2', 3, 3', 4, 4' of the overall apparatus is illustrated in more detail. Here, it can be seen that this comprises three stages 27, 28, 29, for example. Stages 27, 28, 29 of this type can be constructed in the manner of plates, for example, and are used in that the oil to be condensed out is deposited on them and is fed to a collecting container 7, 8. In order to increase the level of efficiency of the heat exchangers 2, 2', 3, 3', 4, 4', it is advantageous if wetting at least of the first stage 27 of the second or third heat exchanger 3, 3', 4, 4' with the oil to be condensed out in each case is carried out. This oil used for that purpose can be taken either from the collecting container 7, 8 and/or a further additional oil reservoir 30. This method can also be used for the agglomerators and/or droplet separators 6. The wetting of at least the first stage 27 facilitates the deposition of similar oil from the solvent-gas mixture.

The control/regulating element 31 illustrated in drawing FIG. 2 distributes the solvent-gas mixture emerging from the drying system 9 to the solvent recovery unit 5, 5'. Here, care should be taken in the distribution that the at least two parallel-operated oil recovery unit 5, 5' are driven in such a way that the residence time of the solvent-gas mixture in the solvent recovery unit 5, 5' can be influenced. For example, the two parallel-connected solvent recovery unit 5, 5' can be dimensioned differently and therefore have a different performance capability in terms of solvent recovery. In particular, depending on the quantity of the solvent-gas mixture to be treated, the solvent recovery unit or both solvent recovery units 5, 5' can be used in order to ensure a defined volume flow or a defined residence time of the solvent-gas mixture in the recovery unit 5, 5'. It has been shown in practice that leading solvent-gas mixture too quickly through the solvent recovery unit 5, 5' substantially impairs the effectiveness of the recovery unit 5, 5'.

In particular, the control and regulation of the first heat exchanger 2, 2' is important, since this has a substantial formative influence on the discharge temperature of the gas passing through it. The effectiveness of the agglomerator and/or droplet separator 6 in turn depends on the temperature of the gas passing through it. Therefore, the first heat exchanger 2, 2' should, if appropriate, be controlled and regulated by the refrigeration output feed line 16 of the absorption refrigerating machine 15 in such a way that the gas leaving the latter has a defined temperature matched to the agglomerator and/or droplet separator 6.

In drawing FIG. 5, further possible uses of the gas within the overall installation are once more illustrated schematically; in this case the exhaust gas 11 from the internal combustion engine 12 is supplied to the drying nozzles, supporting gas nozzles (supporting gas 26) and/or the sealing gas nozzles (sealing gas 25). The gas discharged from these respective nozzles is supplied to the heat exchangers 2, 2', 3, 3', 4, 4' of the solvent recovery unit 5, 5' and, after passing through the latter for use as supporting gas 26, sealing gas 25 is used as exhaust air (the environment 20) and/or, by admixing fresh air 22, as room air for the building 23. In particular as a result of recycling the exhaust gas 19 to the supporting gas nozzles or the sealing gas nozzles, despite the intensive use of drying gas, supporting gas and sealing gas, as compared with the prior art an overall economical system is achieved. This means that, using gas recycling of this type, "more gas-wasteful" dryer types can be used for the (for example print shop operation) paper drying process.

When the gas 19 is used for the supporting gas nozzles or for the sealing gas nozzles, exhaust gas 11 from the internal combustion engine 12 can be admixed with the gas 19.

LIST OF DESIGNATIONS

1 Apparatus
2, 2' Heat exchanger (first)
3, 3' Heat exchanger (second)
4, 4' Heat exchanger (third)
5, 5' Solvent recovery unit
6 Agglomerator/droplet separator
7 Container
8 Container
9 Drying system
10, 10', 10" Dryer unit
11 Exhaust gas from 12
12 Internal combustion engine
13 Generator
14 Electric power
15 Absorption refrigerating machine
16 Refrigeration output
17 Machines
18 Control/regulating element
19 Gas
20 Environment
21 Control/regulating element
22 Fresh air
23 Building
24 Re-cooler
25 Sealing gas
26 Supporting gas
27 Stage 1 of 10
28 Stage 2 of 10
29 Stage 3 of 10
30 Oil reservoir
31 Control/regulating element

The invention claimed is:

1. An apparatus for solvent recovery from a solvent-gas mixture from exhaust air emanating from a printing, varnishing, or other solvent-processing installation, the apparatus comprising:
    a first heat exchanger for cooling a solvent-gas mixture containing at least one oil down to a temperature below a lower condensation temperature of the oil in the solvent mixture;
    a second heat exchanger, connected upstream of said first heat exchanger, said second heat exchanger cooling down the solvent-gas mixture specifically to the condensation temperature of an oil contained in the mixture; and
    said first and second heat exchangers forming a recovery unit for solvent recovery.

2. The apparatus according to claim 1, wherein the solvent-gas mixture contains at least two oils having mutually different condensation temperatures, and said second heat exchanger, connected upstream of said first heat exchanger, is configured to cool down the solvent-gas mixture specifically to a condensation temperature of the oil condensing at a relatively higher temperature.

3. The apparatus according to claim 1, wherein said recovery unit further comprises a third heat exchanger, connected upstream of said second heat exchanger and configured to cool down the solvent-gas mixture specifically to a condensation temperature of an oil having the higher condensation point.

4. The apparatus according to claim 1, wherein said recovery unit further comprises at least one of an agglomerator and a droplet separator, disposed downstream of said first heat exchanger.

5. The apparatus according to claim 1, wherein said recovery unit is one of at least two parallel-connected recovery units.

6. The apparatus according to claim 1, which comprises a dryer unit connected upstream of said recovery unit and, wherein said dryer unit, during a drying process, enriches a gaseous drying medium and a solvent-gas mixture with at least two oils.

7. The apparatus according to claim 6, wherein at least a portion of the drying medium used for the drying process is an exhaust gas from an internal combustion engine.

8. The apparatus according to claim 7, wherein a mechanical energy resulting from an operation of the internal combustion engine is used at least partly to operate at least one of said recovery unit and said dryer unit.

9. The apparatus according to claim 7, which comprises an absorption refrigerating machine connected to receive at least part of the exhaust gas from the internal combustion engine, said absorption refrigerating machine outputting a refrigeration output used at least for supporting an operation of said recovery unit, for cooling further machines and/or for the air-conditioning of buildings.

10. The apparatus according to claim 9, wherein the exhaust gas fed to said absorption refrigerating machine is used as a controlled variable for said recovery unit, is used for machine cooling, and/or is used for building air-conditioning.

11. The apparatus according to claim 9, wherein a feed of the exhaust gases from the internal combustion engine to said absorption refrigerating machine is closed-loop controlled in such a way that it is possible to compensate for a variable exhaust gas/drying medium demand of the dryer unit by means of said absorption refrigerating machine.

12. The apparatus according to claim 11, wherein a feed of drying medium to said dryer unit is variably adjusted in terms of volume and/or temperature by admixing fresh air.

13. The apparatus according to claim 1, which comprises a discharge for at least partly discharging a residual gas emerging from said recovery unit into the environment.

14. The apparatus according to claim 1, which comprises a connection for supplying at least a portion of a residual gas emerging from said recovery unit to said dryer unit as process air and/or, with an admixture of fresh air, at least to some extent for admixing with the building room air.

15. The apparatus according to claim 14, wherein the process air supplied to said dryer unit can, at least to some extent, be used as sealing gas.

16. The apparatus according to claim 14, wherein an oxygen-containing medium can be admixed with the process or sealing air supplied to said dryer unit.

17. The apparatus according to claim 3, wherein at least one of said heat exchangers is constructed with multiple stages.

18. The apparatus according to claim 17, wherein at least a first stage of said second and/or third heat exchanger is configured to be wetted with the oil to be condensed out in each case.

19. The apparatus according to claim 1, wherein said agglomerators can be wetted with at least one of the oils to be separated out there.

20. The apparatus according to claim 5, wherein the at least two parallel-operated recovery units are configured for controlled influencing of a residence time of the solvent-gas mixture in the respective said recovery unit.

21. The apparatus according to claim 1, wherein the at least two oils to be separated out comprise a mineral oil and a synthetic oil.

22. The apparatus according to claim 1, wherein the apparatus for solvent recovery is incorporated in a circuit of a print shop operating in web-fed offset operation.

23. The apparatus according to claim 1, wherein said first heat exchanger is an air-water heat exchanger.

24. The apparatus according to claim 1, wherein said first heat exchanger is configured such that a medium fed by said first heat exchanger to said agglomerators and/or droplet separators has a defined temperature.

25. The apparatus according to claim 1, wherein said dryer unit comprises at least two dryers operating in parallel.

26. The apparatus according to claim 3, wherein at least one of said second and third heat exchangers is an air/air heat exchanger with cold water regulation.

27. A method of recovering at least one solvent from a solvent-gas mixture resulting from a drying process of a print shop machine, which method comprises:

conducting a solvent-gas mixture originating from a dryer device to a recovery unit, the solvent-gas mixture containing at least two oils;
conducting the solvent-gas mixture through a plurality of series-connected constituent parts of the recovery unit including:
first and second heat exchangers;
thereby guiding the solvent-gas mixture first through the second heat exchanger and then through the first heat exchanger; and
thereby cooling the solvent-gas mixture in the second heat exchanger down specifically to a condensation temperature of an oil; and
thereby cooling the solvent-gas mixture in the first heat exchanger down below the lowest condensation temperature of the solvent-gas mixture having the at least two oils; and
collecting the oil separated out at least in the second heat exchanger.

28. The method according to claim 27, which comprises, prior to guiding the solvent-gas mixture through the second heat exchanger, feeding the solvent-gas mixture through a third heat exchanger, cooling down the solvent-gas mixture in the third heat exchanger specifically to a condensation temperature of an oil having the higher condensation point, and collecting the oil separated off by the third heat exchanger in a container, separately from the oil separated out in the second heat exchanger.

29. The method according to claim 27, which comprises, following the first heat exchanger, conducting the solvent-gas mixture through an agglomerator and/or through a droplet separator, and collecting the oils and residues separated off there.

30. The method according to claim 27, which comprises using the gas emerging from the recovery unit, at least to some extent, as sealing gas and/or supporting gas for a dryer and/or as room air.

31. The method according to claim 30, which comprises admixing a proportion of fresh air with the room air.

32. The method according to claim 27, wherein the solvent-gas mixture is an exhaust gas from an internal combustion engine led through a dryer, and an elevated temperature of the exhaust gas is used for drying a medium within the dryer.

33. The method according to claim 32, which comprises conducting at least some of the exhaust gas from the internal combustion engine to an absorption refrigerating machine which, by using a refrigeration energy obtained therefrom, supplies the heat exchangers and/or areas of a surrounding building with refrigeration energy.

* * * * *